US008874700B2

(12) United States Patent
Chan et al.

(10) Patent No.: US 8,874,700 B2
(45) Date of Patent: Oct. 28, 2014

(54) OPTIMIZING STORAGE OF DATA FILES

(71) Applicant: Nextbit Systems Inc., San Francisco, CA (US)

(72) Inventors: Michael A. Chan, San Francisco, CA (US); Justin Quan, San Francisco, CA (US); Daniel R. Borstein, San Francisco, CA (US); Tom Moss, Los Altos, CA (US); Linda Tong, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

(21) Appl. No.: 14/300,104

(22) Filed: Jun. 9, 2014

(65) Prior Publication Data

US 2014/0289376 A1  Sep. 25, 2014

Related U.S. Application Data

(63) Continuation-in-part of application No. 14/222,337, filed on Mar. 21, 2014.

(60) Provisional application No. 61/804,134, filed on Mar. 21, 2013.

(51) Int. Cl.
*G06F 15/16*  (2006.01)
*H04L 29/06*  (2006.01)
*G06F 12/00*  (2006.01)

(52) U.S. Cl.
CPC .................................... *H04L 69/04* (2013.01)
USPC ........................... 709/219; 709/224; 711/100

(58) Field of Classification Search
USPC .................. 709/203, 217–219, 223–229, 250
See application file for complete search history.

(56) References Cited

U.S. PATENT DOCUMENTS

| 2003/0093790 | A1* | 5/2003 | Logan et al. | 725/38 |
| 2006/0184410 | A1* | 8/2006 | Ramamurthy et al. | 705/8 |
| 2012/0215639 | A1* | 8/2012 | Ramer et al. | 705/14.53 |
| 2013/0104251 | A1* | 4/2013 | Moore et al. | 726/30 |
| 2013/0339605 | A1* | 12/2013 | Factor et al. | 711/118 |

* cited by examiner

*Primary Examiner* — Zarni Maung
(74) *Attorney, Agent, or Firm* — Perkins Coie LLP

(57) ABSTRACT

Disclosed are systems, methods, and machine-readable storage mediums for managing storage of a computing device associated with a user. In at least some embodiments, a method includes receiving a request to synchronize a data file from a cloud storage system from a the computing device, determining a classification of the computing device and an access pattern associated with the file, determining a storage optimization operation to be performed on the data file based on the access pattern and the classification, transmitting the file to the device subsequent to execution of the storage optimization operation, and transmitting an updated file based on an updated access pattern. The storage optimization operation can include downsampling, lossy compression, lossless compression, or a combination thereof.

20 Claims, 9 Drawing Sheets

OPTIMIZING STORAGE OF DATA FILES

CROSS-REFERENCE TO RELATED APPLICATION(S)

This application is a continuation-in-part of U.S. Non-Provisional patent application Ser. No. 14/222,337, entitled "STORAGE OPTIMIZATION IN COMPUTING DEVICES," filed on Mar. 21, 2014, which claims the benefit of U.S. Provisional Patent Application No. 61/804,134, entitled "OPERATING SYSTEM AND DEVICE INTEGRATED WITH CLOUD COMPUTING FUNCTIONALITIES," which was filed on Mar. 21, 2013, all of which are incorporated by reference herein in entirety.

FIELD OF THE INVENTION

The following includes various teachings related to storage systems, and more particularly to computing device optimizing local storage by use of data downsampling and compression.

BACKGROUND

Today, consumers are able to consume rich content available over the Internet, whenever and wherever, due to the advent of personal computing devices, such as mobile devices. For example, a user can access a mobile game application, at a mobile device of the user (e.g., a smartphone or a tablet), by connecting to a cloud storage system and downloading the application onto a local cache of the mobile device. A user can download as much content as the user desires, as long as the personal computing device has the necessary storage space.

For computing devices limited in storage capacity, a user may find that there is not enough storage space on a device's local cache to accommodate downloading. Rich multimedia content, such as a typical mobile game application, can include a large amount of data having a size of several gigabytes (GBs). As such, the user may have to delete existing applications or files stored on the mobile device in order to access the application. The user has to decide which existing applications and/or files are important in making such deletions. Accordingly, accessing content of various sources over the Internet becomes burdensome as it requires the user to manage manually local storage space on a frequent basis.

DETAILED DESCRIPTION

Figure 1:
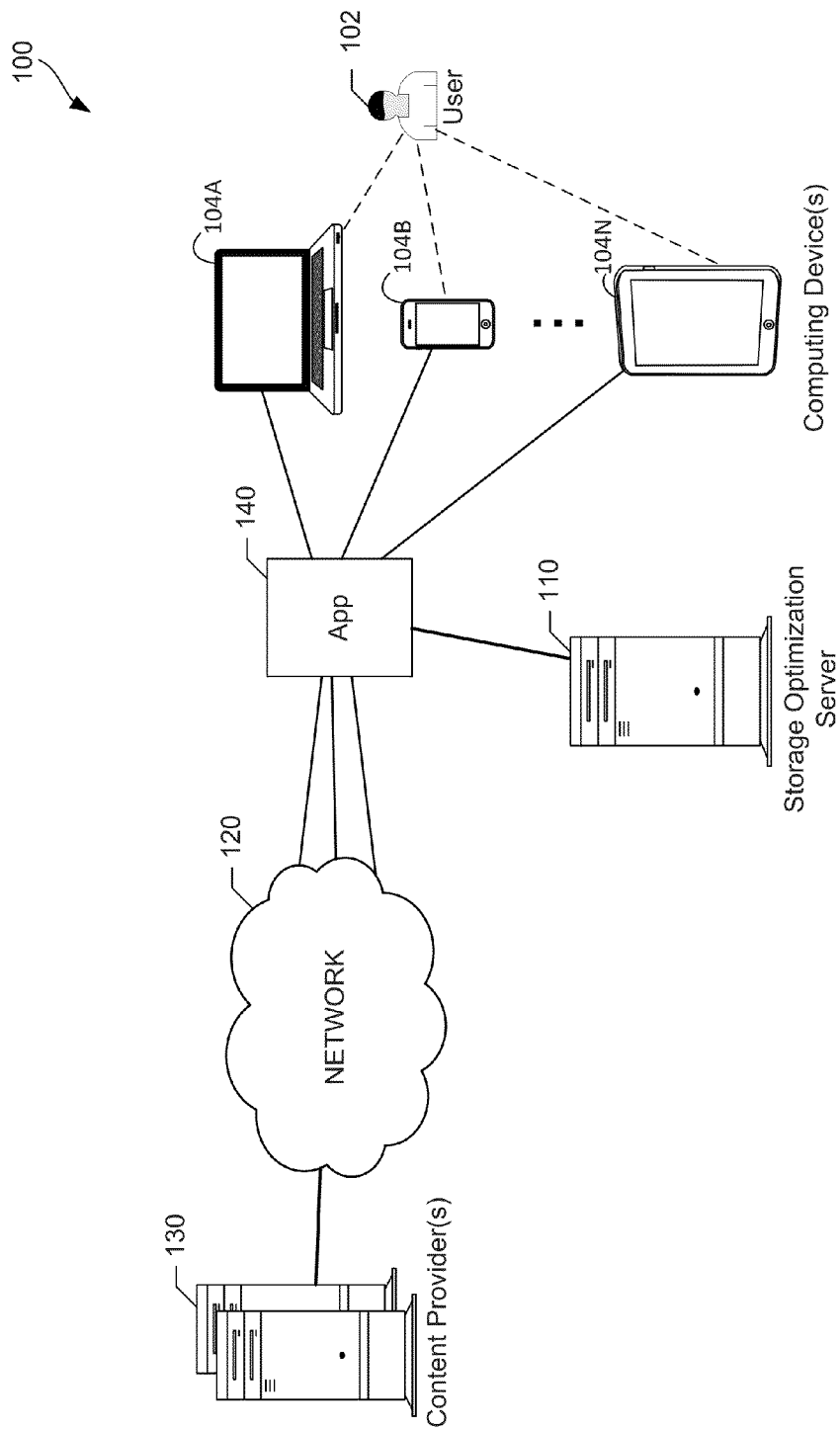
FIG. 1 illustrates an environment in which storage optimization technology can be implemented, in accordance with various embodiments.

References in this description to "an embodiment," "one embodiment," or the like, mean that the particular feature, function, structure or characteristic being described is included in at least one embodiment of the present invention. Occurrences of such phrases in this description do not necessarily all refer to the same embodiment. On the other hand, the embodiments referred to also are not necessarily mutually exclusive.

Introduced here is a technology that optimizes local data storage of a computing device by use of downsampling and data compression ("the storage optimization technology"). According to the technology introduced, methods, systems, and machine-readable storage mediums are provided for selectively downsampling and compressing files downloaded and/or stored in a computing device. In at least some embodiments, a method includes monitoring access patterns in association with data of one or more files accessed by a user of the computing device ("user access patterns" or "access patterns"), determining a classification of the computing device ("device classification" or "device type"), and utilizing the user access patterns and the device classification in deciding when to downsample and/or compress the one or more files. In particular, a storage optimization policy can specify downsampling, lossy compression, lossless compression, or a combination thereof to be applied to the one or more files based on thresholds associated with the user access patterns and/or the device classification. Utilization of the storage optimization policy can enable the computing device to have improved local storage capacity.

In some embodiments, the storage optimization policy is applied when a download of the one or more files to the device takes place. In such embodiments, downsampling can be performed on the one or more files based on the user access patterns associated with those files. In some embodiments, the downsampling can be performed based on the device classification. For instance, where the user accesses a web photo gallery using an iPhone®, image files of the gallery may be downsampled from an iPad® resolution to an iPhone® resolution for download to the device, in accordance with the storage optimization policy as the higher iPad® resolution is not necessary for viewing on the iPhone®. Ultimately, the amount of data of the downloaded files is reduced, saving storage space on the computing device. In some embodiments, the amount of data of the downloaded files is further reduced by use of data compression based on the storage optimization policy. In such embodiments, the files being downloaded are selectively downsampled and compressed for storage on the device.

In some embodiments, the storage optimization policy is applied to reduce data of one or more files already in storage at the device by use of data compression. In some embodiments, data compression can be performed based on the device classification. In some embodiments, data compression can be performed based on user access patterns associated with the files. Data compression can include a lossy compression method and a lossless compression method. The storage optimization policy can specify which compression method is optimal for compressing the data based on the user access patterns. For instance, based on the storage optimization policy, a lossless compression of certain data of a gaming application is performed when access patterns of the user reflects that the data will not likely be used in the near future. In such instance, the lossless compression saves current storage space, yet still provides the user a chance to decompress the data for use at some point in time.

Other aspects of the technology introduced here will be apparent from the accompanying figures and the following description.

FIG. 1 illustrates an example system environment 100 in which the storage optimization technology can be implemented in accordance with various embodiments. The environment 100 includes one or more computing devices 104A-N (where A is 1 and N is an integer) of a user 102, a storage optimization server 110, a network 120, and one or more content providers 130. The computing device 104, the server 110, and the content providers 130 are coupled in communication for data transmission over the network 120.

In some embodiments, the network 120 can be wireless (e.g., which may include an IEEE 802.11 wireless network, or a data traffic network based on wireless telephony services such as 3G, 3.5G, 4G LTE and the like). In some embodiments, the network 120 can be a wired network. The technologies supporting the communications between the computing device 104, the server 110, and the content providers 130 can include Ethernet (e.g., as described in IEEE 802.3 family of standards) and/or other suitable types of area network technologies. One of ordinary skill in the art will understand that the components of FIG. 1 are just one implementation of the computer network environment within which present embodiments may be implemented, and the various alternative embodiments are within the scope of the present embodiments. For example, the network 120 may include intervening devices (e.g., switches, routers, hubs, etc.) in the network 120. In some examples, the network 120 comprises the Internet.

A computing device 104 can be used by the user 102 to communicate with the one or more content providers 130 and/or the storage optimization server 110 in accessing various content. For example, the user 102 uses the computing device 104 to access content provided through a website hosted by a content provider 130. In another example, the user 102 uses the computing device 104 to synchronize its data with the server 110, which operates as a cloud storage server that maintains a copy of the data of the device 104. The computing device 104 includes an operating system (not shown) to manage the hardware resources of the computing device 104 and provides services for running computer applications. The computing device 104 can include a laptop, a desktop, a personal computer, a personal digital assistant ("PDA"), a computing tablet, a smart phone, or any other computing devices capable of running computer applications.

The computing device 104 includes at least one local storage device (e.g., local storage device 220 of FIG. 2) to store the computer applications and user data. The computer applications can include, for example, applications for general productivity and information retrieval (e.g., email, calendar, contacts, and stock market and weather information) or applications in other categories (e.g., mobile games, factory automation, GPS and location-based services, banking, order-tracking, ticket purchases). For example, the user 102 can use a laptop to run a web browsing application, running on an operating system of the laptop, to visit a website hosted by a content provider 130. During such visit, the user 102 can view, or access, multimedia content (e.g., images, videos, etc.) on each webpage of the website using the web browsing application. The multimedia content is typically downloaded to a data storage device of the laptop, such as a local cache storage or any other form of data storage (e.g., a remote storage device). In some instances, the multimedia content stored in the local storage can be synchronized with the server 110. In such instances, for example, the user 102 can have access to the multimedia content by synchronizing with the server 110 even if the content is deleted from the local storage of the device. The user 102 can also access the same multimedia content, for example, through another computing device 104 that is connected to the server 110.

In the illustrated embodiment of FIG. 1, the computing device 104 can execute a computer application 140 (hereinafter, "App 140") for optimizing storage capacity of the device 104, i.e., a "storage optimization application." The App 140 can be a user interfacing application (e.g., a mobile application, a browser application, a desktop application, etc.), or a background process in support of a user interfacing application. The App 140 can monitor data storage related activities of the computing device 104 and perform storage optimization methods based on a set of policies for the purpose of reducing the amount of data stored in the computing device. The set of policies includes one or more policies based on user access patterns and device classification.

Although the App 140 is illustrated in FIG. 1 (as well as described throughout the disclosure) as a separate entity from the computing device 104, it is noted that in some specific embodiments, both the computing device 104 and the App 140 can be implemented in the same computing device, such as a smart phone or a tablet computer. For example, the App 140 can be implemented by, or a part of, the operating system of the computing device 104, such that the standalone computing device can be the sole host of the environment 100 and practice the various techniques disclosed herein. In some embodiments, the App 140 can be implemented by, or a part of, the storage optimization server 110. In some embodiments, the various functionalities of the App 140 can be distributed between the computing device 104 and the storage optimization server 110. In particular, certain functionalities can run at the computing device while other functionalities can run at the storage optimization server 110 for the purpose of implementing the storage optimization technology.

The storage optimization server 110 (hereinafter, "server") is configured to communicate with the one or more computing devices 104. The server 110 can be one or more server computers or work stations that are employed by a storage optimization service for facilitating storage optimization in association with files being downloaded and/or stored by the computing device 104 from the content providers 130. In some embodiments, the server 110 itself can serve as a "content provider" to the computing device 104 by storing files of the device 104 (e.g., as a backup) for access by the device 104 upon request by the device 104 (e.g., during synchronization). The server 110 typically includes at least one processor and a memory, and may be further connected to one or more computers (not shown in FIG. 1 for simplicity) via the network 120. The server 110 is typically equipped with or is coupled to one or more storage devices (e.g., storage device 308, discussed below in relation to FIG. 3). In some embodiments, the server 110 can contain storage nodes (not shown), where each of the storage nodes contains the processor and the one or more storage devices. The storage devices can include optical disk storage, RAM, ROM, EEPROM, flash memory, phase change memory, magnetic cassettes, magnetic tapes, magnetic disk storage or any other computer storage medium which can be used to store the desired information. In one example, the storage devices can store data files, including image files, audio files, video files, etc. In another example, the storage devices can store storage optimization policies, access patterns of one or more users of one or more computing devices, and/or device classifications of the one or more computing devices.

In some embodiments, the operating system of the computing device 104 includes a data synchronization module (not shown) to synchronize the data of the computing device 104 with the server 110. For example, the data synchronization module may continuously monitor the file system of the computing device 104 and synchronize any newly generated data for the device 104 in real time. In another example, the data synchronization module may facilitate data file access requests from the device 104 to the server 110 for files that are not stored on the local storage device of the device 104. In some embodiments, the data synchronization module works in coordination with the App 140 to optimize the storage capacity of the computing device 104. For example, to answer a data file request of the device 104, the data synchronization module synchronizes a downsampled version of a data file (from the server 110), as opposed to an original version of the data file, based on a command from the App 140.

In some embodiments, the App 140 is executed by the server 110, working in coordination with the computing device 104. In such embodiments, the server 110 executes the App 140 to work in coordination with the data synchronization module to facilitate synchronization of the data of the computing device 104, such that the data being synchronized to the device 104 is optimized for storage in the device 104 based on the storage optimization processes.

Figure 2:
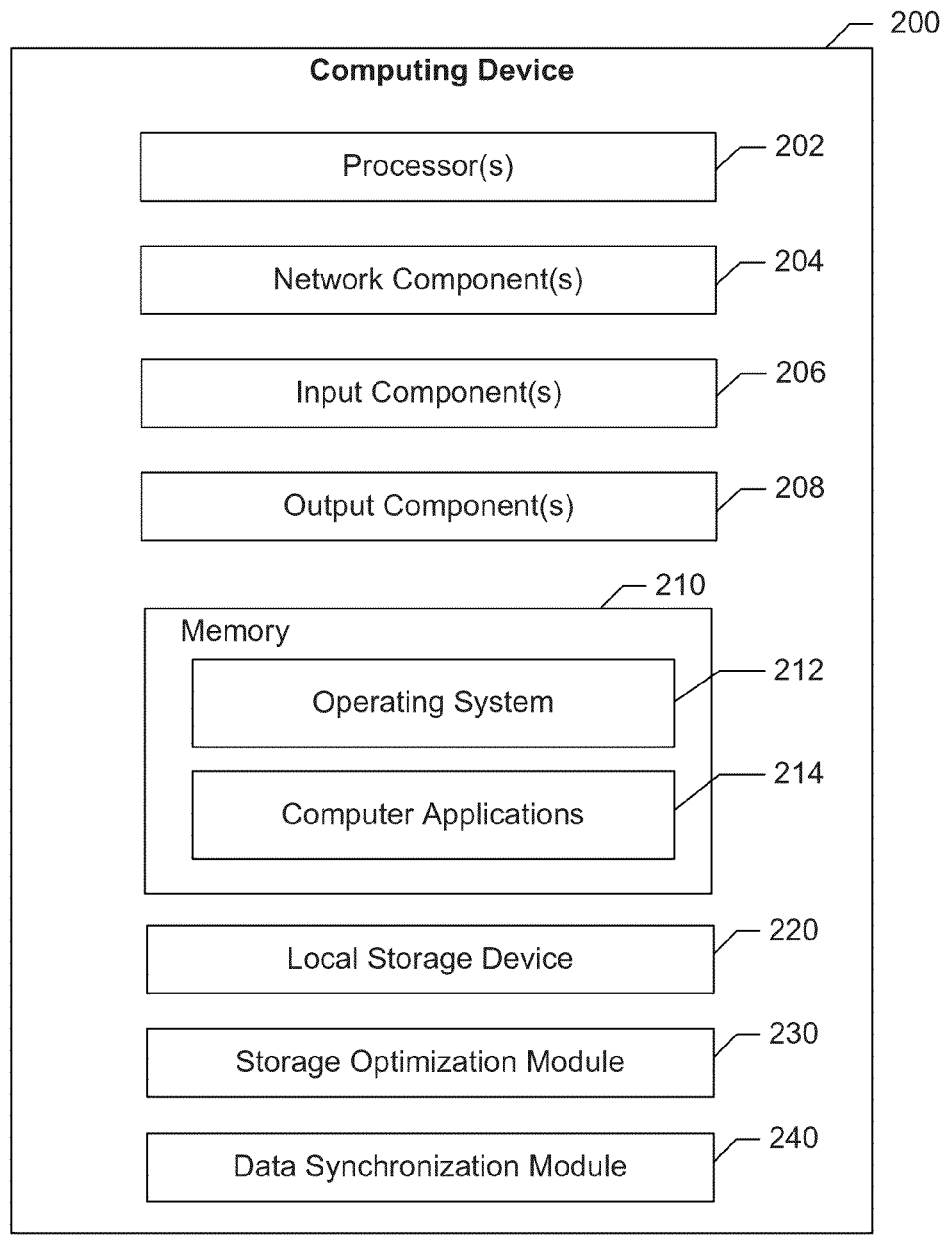
FIG. 2 illustrates components/modules of or associated with a computing device, in accordance with various embodiments.

FIG. 2 illustrates certain components (or modules) of a computing device 200, in accordance with various embodiments. In at least some embodiments, the computing device 200 can be the computing device 104 of the system environment 100 of FIG. 1. The computing device 200 can include at least one or more processors 202, one or more network components 204, and a memory 210. The computing device 200 can also include one or more input components 206 (e.g., a touch screen, a keyboard, a mouse, etc.), one or more output components 208 (e.g., a display, a printer, a speaker, etc.), a local storage device 220, and a storage optimization module 230.

The one or more processors 202 are configured to execute instructions of computer applications 214 and an operating system 212 of the computing device 200. The memory 210 includes the operating system 212. The operating system 212 is a collection of software instructions that provide services for computer programs and other software modules, such as the storage optimization module 230, and manage computer hardware resources, such as the components 202, 204, 206, 208, and 220. One or more computer programs, such as computer applications 214, can run on the operating system 212 when executed by the one or more processors 202.

The operating system 212 can include a data synchronization module 240. The data synchronization module 240 can be implemented as a service running at the background of the operation system 212 to send access requests from the device 200 for data files stored in a synchronization device (e.g., a server such as server 110 or another computing device). For example, the device 200 may choose to store a video file in a server in order to save local storage space and be able to access it at a later time. In another example, the device 200 may choose to store the file in the server in order to be able to access it using another device (e.g., a mobile device while the user is on-the-go).

In some embodiments, the data synchronization module 240 can coordinate with the storage optimization module 230 to determine an appropriate version of the requested data file for download from the server to the device 200. For example, if a user of the device 200 first records a high quality video using a desktop computer and uploads that video file to a server, the user can then use the device 200, which can be, for example, a smartphone, to request that same file from the server to be downloaded to the smartphone for viewing. In such example, the storage optimization module 230 may determine that a lower quality video file, as opposed to the original video file, is sufficient for synchronizing to the smartphone.

The network component 204 can be, for example, a Wi-Fi networking adapter, a cellular phone networking adapter, or a combination thereof. The network component 204 is configured for network communications with other devices, including the server 110 and the content providers 130, for example, for sending content requests and receiving content (e.g., multimedia files) from the content providers 130, or for receiving a downsampled or compressed version of the data files from the server 110 as part of a storage optimization process.

The local storage device 220 can store the instructions of the operating system 212, user data, such as data about access patterns of the user, data files of the user, and any other data necessary for the operation of the computing device 200 and execution of the computer applications 214. The local storage device 220 can include, for example, one or more hard drives (which may be further coupled together using RAID-0, 1, 5, 10, etc.). In some embodiments, the local storage device 220 can include a centralized or distributed data cluster, a cloud-storage service provider, or other suitable storage systems suitable for storing digital data.

The storage optimization module 230 can perform the various storage optimization functionalities of the App 140 of FIG. 1. The storage optimization module 230 is configured to manage and maintain a set of storage optimization policies (i.e., one or more policies) for the computing device 200. The storage optimization module 230 can assist the computing device 200 in reducing the amount of data of files that gets stored in the local storage device 220 by causing storage optimization methods to be executed based on the set of storage optimization policies. In some embodiments, the storage optimization methods can include various data compression methods, including lossy compression and lossless compression.

The storage optimization module 230 can provide the operating system 212 an indication of compressibility ("compressibility indication") of data associated with one or more files stored in the local storage device 220. The compressibility indication is generated by the storage optimization module 230 based on access patterns in association with the data. The compressibility indication can include whether or not a portion, or a whole, of the data is compressible. The operating system 212 can receive such indication to decide whether to compress the data in order to optimize the storage capacity of the local storage device 220. In some embodiments, the compressibility indication can include a recommendation of a particular data compression method to be implemented.

In one example, the storage optimization module 230 identifies that certain data components, of a gaming application stored on the computing device 200, have not been accessed by the user of the device 200, and performs a prediction that those data components have a low probability of being accessed in a near future. In some embodiments, the storage optimization module 230 can further determine that the data components may still be pertinent to the gaming application. In such embodiments, the storage optimization module 230 generates a compressibility indication to indicate that those data components are compressible, and that the optimal compression method is lossless compression to allow for reconstruction of the compressed data. In other embodiments, the storage optimization module 230 generates a compressibility indication that indicates only whether the data components are compressible based on the access pattern. The operating system 212 can use the compressibility indication to determine whether lossy compression or lossless compression is appropriate for compressing the data components.

In some embodiments, the storage optimization module 230 works in coordination with the data synchronization module 240 to facilitate storage optimization of a data file being synchronized with the version stored in a synchronization device (e.g., the server 110, which is operating as a cloud storage server according to an embodiment, or another computing device). In such embodiments, the data synchronization module 240 utilizes the compressibility indication to determine whether to synchronize a compressed version, or original version, of the data file. In some embodiments, the compressibility indication can include a recommendation of a particular data compression method to be implemented, for example, if the compressed version is indicated as the appropriate version for synchronization.

The storage optimization module 230 can be part of the memory 210. The storage optimization module can be executed by the one or more processors 202. The storage optimization module 230 can be part of a computer application 214. The storage optimization module 230 can also be part of the operating system 212. The storage optimization module 230 can run a background process on the operating system 212, accessible to any application running on the operating system 212.

For example, the storage optimization module 230 can perform in the background the monitoring of access patterns associated with data of various files stored in the local storage device. In response to determining that certain data have not been utilized or accessed by the computing device 200 (e.g., the user has not looked at a photo album for the last 10 months), the storage optimization module 230 can alert the operating system 212 (e.g., compressibility indication). In some embodiments, the storage optimization module 230 can work in coordination with another application running on the operating system 212 to cause compression of the certain data.

In embodiments, the storage optimization module 230 can run a service accessible within the operating system 212 and/or across a network (e.g., via the network components 204). For example, the storage optimization module 230 causes performance of downsampling working in coordination with the server 110 of FIG. 1.

The storage optimization module 230 facilitates the computing device 200 to perform the storage optimization operations, for example, including the receiving, from the server 110 of FIG. 1, downsampled and/or compressed versions of data files sent by the content providers 130 of FIG. 1, or the compressing of data files already stored in the local storage device 220, by use of one more components (or modules). Additional details with respect to the components/modules of the storage optimization module 310, and the corresponding functionalities of those components/modules, are described with reference to FIG. 4 below.

Figure 3:
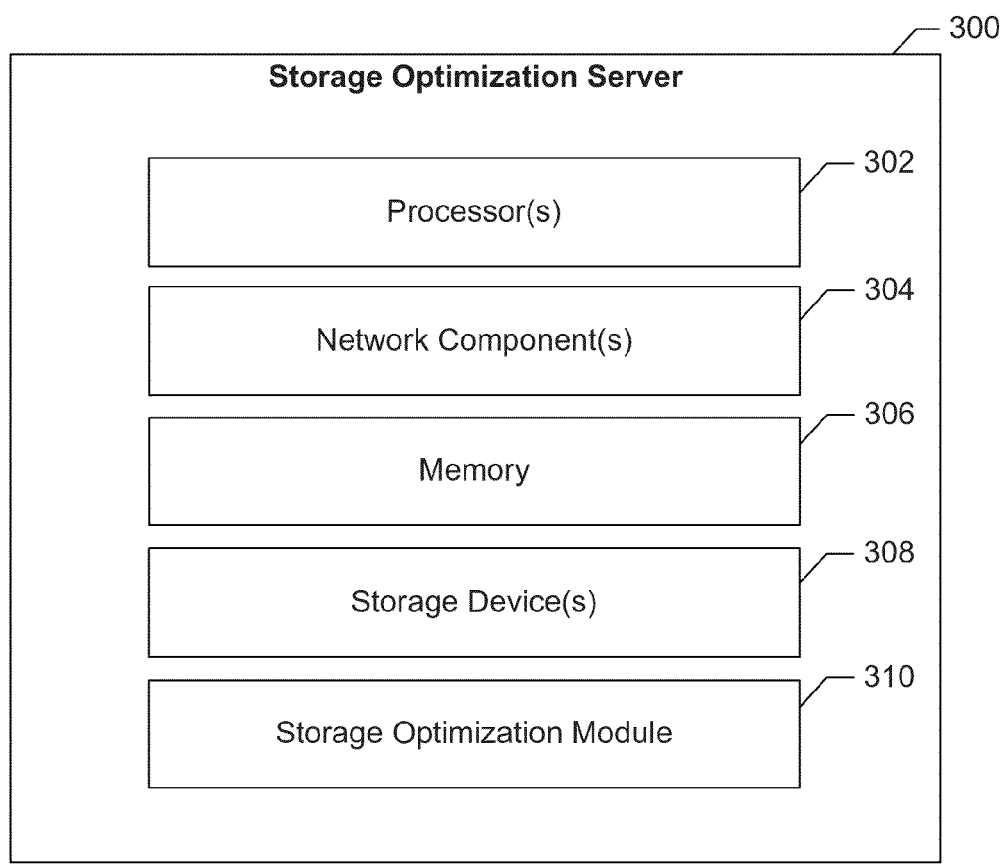
FIG. 3 illustrates components/modules of or associated with a server, in accordance with various embodiments.

FIG. 3 illustrates components (or modules) of or associated with a server 300, in accordance with various embodiments. In at least some embodiments, the server 300 can be the server 110 of FIG. 1. The server 300 can include one or more processors 302, one or more network components 304, one or more memories 306, one or more storage devices 308, and a storage optimization module 310. A memory 306 can include instructions which when executed by the one or more processors 302 enables the server 300 to perform the operations, including storage optimization. A storage device 308 can include, for example, one or more hard drives, a centralized or distributed data cluster, a cloud-storage service provider, or other suitable storage systems suitable for storing desired digital data. In some embodiments, the server 110 can contain storage nodes, where each of the storage nodes contains the one or more processors 302 and the one or more storage devices 308 for storing data files of one or more computing devices, such as devices 104A-N of FIG. 1. In such embodiments, the server 110 can operate, for example, as a cloud storage server to store instances of data files of one or more computing devices.

The one or more network components 304 is configured for network communications with other devices, including, for example, the computing devices 104A-N or the one or more content providers 130 of FIG. 1. For example, the one or more network components 304 can be utilized for receiving data files from the content providers 130 (i.e., intercepting a transmission of data files) upon detecting a download request of the data files of the computing device 104, and for sending a downsampled and/or compressed version of the data files to the computing device 104 as part of a storage optimization process. In another example, the one or more network components 304 can be utilized to communicate with a data synchronization module (e.g., data synchronization module 240 of FIG. 2) to facilitate synchronization of data files of one or more computing devices. In such example, the network components can assist the storage optimization server 300 to facilitate storage optimization of the data files being synchronized, such as sending and transmitting the appropriate data versions of the data files between the server 300 and the one or more computing devices.

The storage optimization module 310 can facilitate the various storage optimization operations of the App 140 of FIG. 1. In the embodiment of FIG. 3, the storage optimization module 310 enables the server 300 to perform the storage optimization operations, including the intercepting/receiving and/or sending downsampled and/or compressed versions of data files from/to the one or more computing devices 104A-N, as part of the storage optimization. Additional details with respect to the components/modules of the storage optimization module 310, and the corresponding functionalities of those components/modules, are described with reference to FIG. 4 below.

Figure 4:
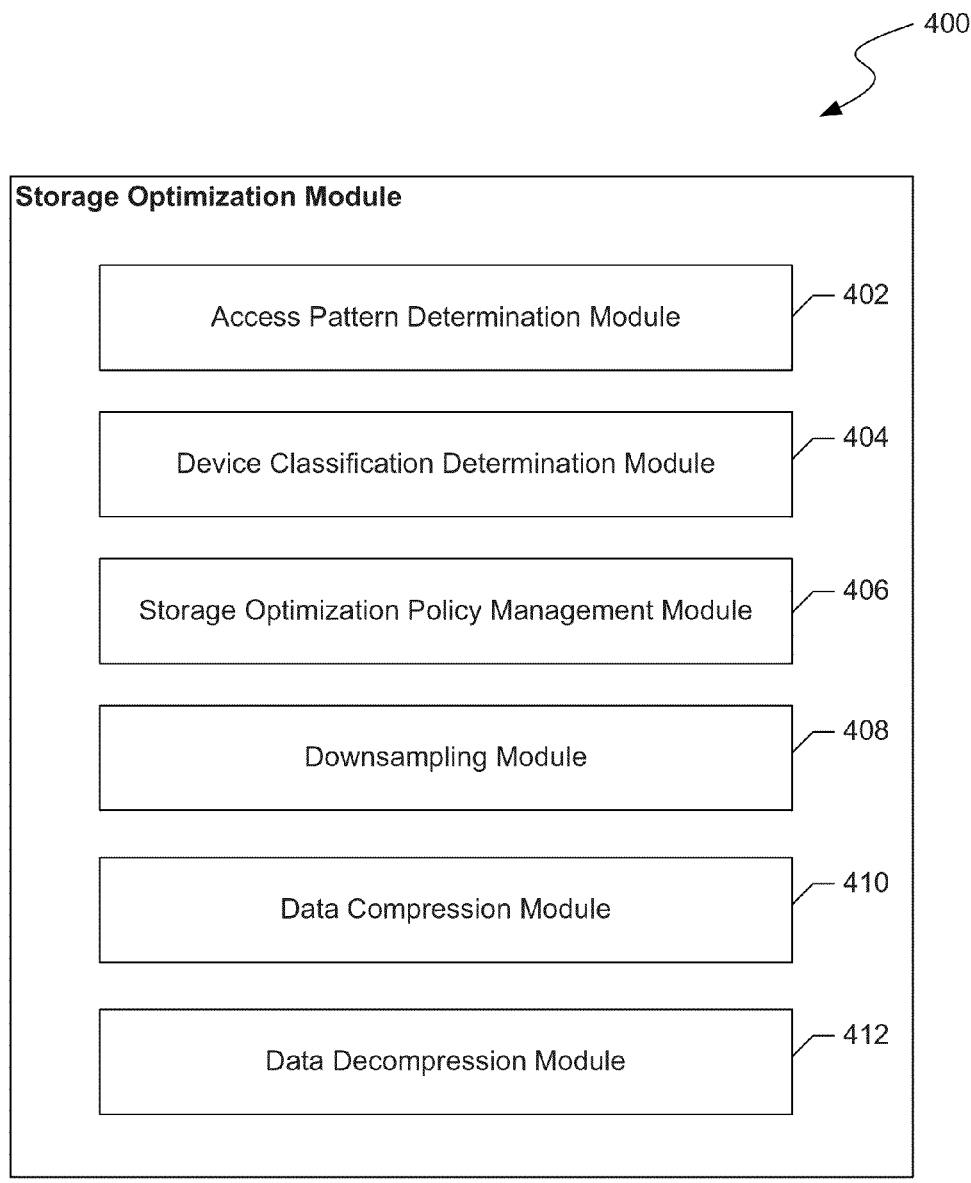
FIG. 4 illustrates components/modules of or associated with a data synchronization module, in accordance with various embodiments.

FIG. 4 illustrates components/modules of or associated with a storage optimization module 400, in accordance with various embodiments. The optimization module 400 can facilitate the various storage optimization operations of the App 140 of FIG. 1. In some embodiments, the storage optimization module 400 can be used to implement the storage optimization module 230 of the computing devices 200 of FIG. 1, or the storage optimization module 310 of the server 300. In some embodiments, the storage optimization module 400 can be used in reducing the amount of data of files being downloaded to a user device of a user based on storage optimization policies. In some embodiments, the storage optimization module 400 can be used in reducing the amount of data of files already stored on the computing device based on the storage optimization policies. The user device can be any of the computing devices 104A-N of FIG. 1 or the computing device 200 of FIG. 2.

The storage optimization module 400 includes an access pattern determination module 402 to monitor the access of data files on the user device by the user, and to generate one or more access patterns based on various parameters. A storage optimization policy management module 406 can use the access patterns to define the storage optimization policies for identifying files that can be compressed and/or files that can be downsampled. The various parameters of a particular access pattern can include (a) a frequency of access of a particular data file, (b) a number of times the particular data file is requested or downloaded to the user device from another computing device (e.g., content provider 130 of FIG. 1, computing device 140B, etc.), (c) a time period for which the particular data file is accessed using the user device, (d) a last access time of the particular data file, (e) a location of the particular data file being accessed or requested for download, etc. In some embodiments, the access pattern determination module 402 uses a particular access pattern to determine (a) a likelihood of a particular data file being accessed in the future and/or (b) a likelihood of the particular data file being accessed in its entirety in the future (i.e., the original data needs to be perfectly reconstructed, e.g., in the case of data compression). The access patterns can be stored, for example, in the storage device 220 of the computing device 200 or the storage device 308 of the server 300.

In some embodiments, the access pattern determination module 402 resides at a server (e.g., server 110 of FIG. 1) and works in coordination with another access pattern determination module that resides on the user device. In such embodiments, the access pattern determination module residing at the user device can monitor the access of the data files on the user device and transmit the access pattern to the server. In particular, the parameters are collected by the user device itself, for example, using the access pattern determination module of a "storage optimization sub-module" at the device (e.g., storage optimization module 230), where the sub-module works in coordination with the storage optimization module located at the server (e.g., storage optimization module 310 of the server 110). The access pattern determination module at the server can aggregate and consolidate the parameters associated with the access patterns received from the user device for different sets of data files and perform a storage optimization operation based on the access patterns determined from the parameters. The access pattern determination module at the server can also receive the parameters associated with the access patterns from other user devices that are using the data files. For example, the access pattern determination module at the server can determine, based on data received respectively from the access pattern determination module of a laptop and of a smartphone, access patterns associated with a video file for the laptop and for the smartphone, respectively. For example, the access patterns indicate that the video file is (a) often accessed for editing at the laptop and (b) occasionally accessed only for viewing at the smartphone. The storage optimization module at the server, based on the access patterns, can determine then, for example, that the original high quality format of the video file is the appropriate format to be synchronized to the laptop, but a downsampled and compressed format of the file is the appropriate format to be synchronized to the smartphone. In some embodiments, the storage optimization module at the server, can prompt the laptop, for example, to replace its high quality copy of the video file in exchange for a downsampled and compressed copy to optimize storage space. In some embodiments, the module at the server automatically synchronizes the downsampled and compressed copy without any prompting.

The storage optimization module 400 includes a device classification determination module 404 to identify a classification, or type, of the user device. A device classification (or device type) can be categorized into general categories, specific subcategories of a general category, or any combination thereof. For example, the device classification can be a mobile device (e.g., a laptop) or a non-mobile device (e.g., a desktop), where subcategories of such classification can include, for example, a smartphone, a computing tablet, or a laptop. In another example, the device classification can be an Xbox, a Kindle, an iPad, an iPod, an iPhone, a laptop, or a desktop. The storage optimization policy management module 406 can use the device classification to define the storage optimization policies for identifying files that can be compressed and/or files that can be downsampled. For example, if the user device is an iPhone®, the storage optimization policy management module 406 can utilize such information to recommend downsampling the image resolution of a file from an iPad® quality to an iPhone® quality. As a result, the amount of data of the file is reduced when the file is downloaded, or stored, to the iPhone.

The storage optimization module 400 includes the storage optimization policy management module 406 to manage and to maintain a set of storage optimization policies for reducing the amount of data stored on the user device. The storage optimization policy management module 406 may provide a user interface to manage the storage optimization policies, for example, to customize existing storage optimization policies, to remove existing storage optimization policies, or to add new storage optimization policies. The storage optimization policies can be managed by the user of the computing device 104 and/or an administrator of the server 110 of FIG. 1.

In some embodiments, the storage optimization policy management module 406 generates the storage optimization policies based on various thresholds. The thresholds can be based on (a) the access patterns of files being downloaded and/or stored to the user device, (b) the device classification, and/or (c) other factors that may affect availability of the download or the storing of files to the user device. The thresholds can be a percentage scale or a time period. For example, a policy can include that a data file should be downsampled if the file has not been accessed in the last month. In another example, a policy can include that a data file should be compressed if the 80% of the file has not been accessed in the last week. The thresholds can be configured by the user of the computing device 104 and/or an administrator of the server 110 of FIG. 1.

In some embodiments, the storage optimization policy management module 406 can provide an indication of whether downsampling is appropriate for a data file being downloaded to the user device ("downsampling indication"). The downsampling indication is generated by the storage optimization policy management module 406 based on the access pattern of the data file and based on the device classification. A downsampling module 408, in response to receiving such indication, can proceed to downsample the data file.

In some embodiments, the storage optimization policy management module 406 can provide an indication of compressibility ("compressibility indication") of data associated with one or more files stored on the user device. The compressibility indication is generated by the storage optimization policy management module 406 based on access patterns in association with the data. The compressibility indication can include whether or not a portion, or a whole, of the data is compressible. A data compression module 410, in response to receiving such indication, can proceed to compress the data. In some embodiments, the compressibility indication can include a recommendation of a particular data compression method to be implemented (e.g., lossy compression or lossless compression).

In some embodiments, the storage optimization policy management module 406 can provide a recommendation of perform data compression on a downsampled file. For example, at the download of a music file, the file is downsampled, and then further compressed for storage in the user device. Such example may occur if space is limited on the storage device of the user device, and the user is performing the download for later usage (e.g., to send via e-mail to another user).

In some embodiments, the storage optimization policy management module 406 monitors data storage related activities of the user device, and generates the downsampling indication and/or compressibility indication based on the activities. The data storage related activities can include an activity triggering a download of content, such as viewing of a webpage, streaming of a video, accessing of music from a cloud service, automated synchronization of files occurring in the background (e.g., periodically scheduled synchronization), etc., or an activity triggering storage management, such as increase of storage usage in the current month as compared to the previous month, recent installations of new application(s), etc.

In one example, when the user accesses a Pinterest® webpage using the user device, the web browser application running on the device sends a request for content, such as image files, to a server hosting the Pinterest® webpage (e.g., website hosted by a content provider 130 of FIG. 1), where the request results in certain data of the content getting cached, or downloaded, to a local storage device. In such example, the storage optimization policy management module 406 can detect the request activity (i.e., initiation of download) based on its monitoring of the device. In the example, the module 406 can be executing on a proxy server (e.g., proxy server implemented in the form of the server 300). In response to such detection, the storage optimization policy management module 406 communicates with the access pattern determination module 402 and the device classification determination module 404. The access pattern determination module 402 provides the access pattern associated with the content requested and the classification determination module 404 provides the device classification.

Further, in the example, based on the access pattern and the device classification, the storage optimization policy management module 406 selects one or more storage optimization methods based on the set of storage optimization policies, and generates the appropriate one or more indications including the method(s). The indications can include, for example, whether the image files can (and/or should) be downsampled before being downloaded to the device, and whether image files can (and/or should) be compressed. In some embodiments, the indications include whether lossy compression or lossless compression should be performed.

The storage optimization module 400 includes a downsampling module 408 to perform operations associated with downsampling of one or more data files being downloaded by the user device. The downsampling module 408 can be utilized to downsample a particular file that is specified by the storage optimization policy management module 406 to be downsampled, based on a storage optimization policy. For example, the downsampling module 408 generates a downgraded format of the particular file for transmitting to the user device. As used here, the term "downgraded format" refers to a format of the file that contains a lower amount of information than that of the original format so that a downloading of such file consumes lesser time and/or bandwidth compared to the original format.

The storage optimization module 400 includes a data compression module 410 to perform operations associated with data compression of one or more data files being downloaded by the user device. As discussed above, two types of data compression can occur: lossy compression and lossless compression. The data compression module 410 can be utilized to compress a particular file that is specified by the storage optimization policy management module 406 to be compressible, based on a storage optimization policy. The storage optimization policy can specify which compression method (e.g., lossy compression and lossless compression) is optimal for compressing the data based on the user access patterns. For example, where a particular storage optimization policy specifies that lossless compression is optimal where 90% of the data files of a particular application is in usage and/or there is uncertainty whether the 10% is needed by the particular application, a lossless compression of the 10% is recommended. In such example, the access pattern determination module 402 generates a prediction that, based on the access pattern of the user in relation to the 10% of the data, that 10% of the application will not likely be used in the near future. As such, the lossless compression will enable saving of current storage space while still providing a chance to decompress the data for use at some point in time.

In some embodiments, the data compression module 410, working in coordination with the storage optimization policy management module 406, to determine and generate the compressibility indication. In such embodiments, the data compression module 410 communicates to the user device's operating system which data of one or more files stored in a local storage of the device are compressible based on the access patterns. In some embodiments, the data compression module 410 can determine and generate an indication whether a lossy compression method or a lossless compression method is optimal for compressing the data based on the access patterns. Accordingly, the total amount of data stored on the device is continuously reduced without affecting a user's access to the files.

In some embodiments, the storage optimization module 400 includes a decompression module 412 to perform operations associated with decompression of the compressed data of one or more files. In such embodiments, the decompression module 412 may reside on the user device for decompressing data files received from another computing device (e.g., content provider 130 of FIG. 1, server 110 of FIG. 1, etc.). In other embodiments, the decompression module 412 is a standalone module separate from the storage optimization module 400. In such embodiments, the decompression module 412 may reside, for example, on the user device to assist the user in reconstructing information from compressed files.

In some embodiments, some of the components (or modules) of the storage optimization module 400 discussed above may reside on the computing device 104, while other components (or modules) reside on the storage optimization server 110 of FIG. 1. In such embodiments, the combined components/modules, of the computing device 104 and the server 110, work in coordination as one storage optimization mechanism. In some embodiments, a majority of the components/modules of the storage optimization module 230 may reside in the computing device 104, and can work in coordination with a few of the components/modules residing on the storage optimization server 110. For example, all of the modules, except for the downsampling module 408, reside on the computing device 104. In another example, all of the modules, except for the storage optimization policy management module 406, reside on the computing device 104.

In some embodiments, the majority of the components/modules of the storage optimization module 400 may reside, instead, on the storage optimization server 110 of FIG. 1. In such embodiments, consider a first example where a user is viewing a web gallery of photos using a web browser running on the user's smartphone. The web browser sends a request to access the photos from a server hosting the web gallery (e.g., content provider 130 of FIG. 1). The web browser's request is detected by the storage optimization module 400 that has a majority of its components/modules residing on the server 110. For instance, it can be the storage optimization policy management module 406, which resides on the server 110, that detects the web browser's request (i.e., a data storage related activity).

In such instance, in response to the detection, the storage optimization policy management module 406 decides the appropriate storage optimization operation based on the access pattern in association with the photos being requested by the web browser and based on the device classification. The storage optimization policy management module 406 communicates with the access pattern determination module 402 and the device classification determination module 404, both of which reside on the server 110, to obtain the access pattern and the device classification. The access pattern indicates, for example, that there is a low likelihood the user will look at the photos again as the user frequently visits a variety of different web galleries on a daily basis because (i.e., a mere browsing experience). Further, the device classification indicates that the user is using a smartphone device, and as such, a lower resolution of the photos will not affect the user's viewing experience (i.e., full resolution is unnecessary). Based on this information, the module 406 determines that downsampling is the optimal storage optimization method.

In another instance, it can be the access pattern determination module 402, which resides on the server 110, that detects the request, for example, as part of the monitoring process that the module 402 regularly performs. The access pattern determination module 402 can alert the storage optimization policy management module 406, which resides on the server 110, of the occurrence of the browser's request (i.e., a data storage related activity). The storage optimization policy management module 406 can request the device classification information from the device classification determination module 404, which also resides on the server 110, and determines that downsampling is the optimal storage optimization method.

In response to the determination that downsampling is appropriate, the storage optimization policy management module 406 can cause the server 110 (e.g., communicate with the operating system of the server) to intercept the content transmitted from the web gallery to the smartphone, and downsample the content. The downsampling can be done, for example, by the downsampling module 408 residing on the server 110. The storage optimization policy management module 406 may, at this step, also cause the server 110 to compress the downsampled (i.e., downgraded) content, based on a storage optimization policy (e.g., compress when access pattern indicates unlikelihood of usage in a near future). This can be performed, for example, by the data compression module 410 residing on the server 110. The server 110 then forwards (e.g., via a network component) the smartphone resolution images to the user's device. As a result, a smaller amount of data gets downloaded, or stored, to the device.

Data compression method can also be performed by components/modules residing on the server 110. The access pattern determination module 402, for example, can be working in coordination with one or more network components of the server 110 to monitor, over a network, the user's access of content stored on the user's device. The access pattern determination module 402 can work with the storage optimization policy management module 406 to determine when data compression (and type of data compression) is appropriate, the storage optimization policy management module 406 can work in coordination with one or more network components of the server 110 to communicate with the user's device, and cause the device to perform data compression (e.g., communicate with operating system of the device). The device may utilize a data compression module 410 that resides on the device to communicate with the storage optimization policy management module 406 and perform data compression on the identified set of data files.

Consider a second example where the user is using a computing device to request data files stored at the server 110 of FIG. 1, e.g., through a data synchronization request. Similar to the first example, the second example is discussed in accordance with an embodiment in which the majority of the components/modules of the storage optimization module 400 reside on the storage optimization server 110 of FIG. 1. The storage optimization module 400 receives a communication from a data synchronization module of the computing device (e.g., data synchronization module 240 of FIG. 2) requesting one or more data file(s) from the server 110. The communication can be received, for example, by a network component 304 of FIG. 3. In response to receiving the request for the data files, the storage optimization module 230 performs a sequence of steps similar to those described above with respect to the first example. In particular, the storage optimization policy management module 406, coupled to the network component, detects the request and proceeds to decide the appropriate storage optimization method. The optimization policy management module 406 communicates with (1) the access pattern determination module 402 and (2) the device classification determination module 404 to identify, respectively, the access pattern associated with the requested data file and the device classification of the device sending the request.

If the optimization policy management module 406 determines that downsampling is appropriate, the storage optimization policy management module 406 can cause the data file to be downsampled, for example, by transmitting a message to the downsampling module 408 to execute a downsampling operation. The downsampled version of the data file is then transmitted (e.g., synchronized) to the requesting computing device, for example, via communication with the data synchronization module of the device. If the optimization policy management module 406 determines that compression is appropriate, the storage optimization policy management module 406 can cause the data file to be compressed, for example, by transmitting a message to the compression module 410 to execute a compression operation. In some embodiments, both downsampling and compression are performed on the data file, in accordance with the storage optimization policies.

In some embodiments, the optimization policy management module 406 performs the determination of the appropriate storage optimization method upon storage of a data file at the server. For example, a user uploads for storage at the server a video file that is created using a laptop. Upon the storage activity occurring, the optimization policy management module 406 determines the appropriate storage optimization method. For example, the optimization policy management module 406 causes generation of several versions, or formats, of the video file for storage in the server (e.g., data files compressed at various sizes). In another example, the optimization policy management module 406 causes pre-configuration of the different types of encoding needed for the file when downsampling occurs (at a later time) (e.g., data files to be downsampled using various encodings).

At a later time, the optimization policy management module 406 can select the appropriate version (or encoding) of the file, from any of the versions (or encodings) already stored (or pre-configured) at the server, to deliver to a user device. For example, when the user uses a smartphone to access the video file (e.g., sends a request to the server for the file), the server, working in coordination with the optimization policy management module 406 and the data synchronization module of the smartphone, transmits to the smartphone a particular version of the file (of many stored versions) that is determined as appropriate by the optimization policy management module 406 (e.g., by device classification and access patterns).

In some embodiments, the server automatically transmits to the smartphone the appropriate version (or encoding), of many stored versions (or encodings), as part of a synchronization process in which the smartphone and the laptop are connected to the server that is configured to synchronize data files across the two devices. In such embodiments, the smartphone may not necessarily have requested for the video file, which has been created and uploaded to the server from the laptop; the appropriate file is automatically delivered the smartphone based on access patterns associated with other files stored on the smartphone. For example, the optimization policy management module 406 at the server identifies that access patterns indicate that the user often views video files created by the laptop using the smartphone, and that the user only views and does nothing else with the video files. Based on those access patterns, the optimization policy management module 406 makes a prediction that the user of the smartphone will likely watch the video, and works in coordination with the data synchronization module of the smartphone to cause the downsampled and compressed version of the video file to be automatically synchronized to the smartphone, without requiring the smartphone to send a request. In another example, the optimization policy management module 406 identifies that the access patterns indicate that the user often edits video files using the smartphone. In such example, the optimization policy management module 406 works in coordination with the data synchronization module of the smartphone to cause a higher quality version of the video file to be automatically synchronized to the smartphone, without requiring the smartphone to send a request.

With respect to FIGS. 2-4, it is noted that the one or more modules/components described can be implemented as instructions on a tangible storage memory capable of being executed by a processor or a controller. The tangible storage memory may be volatile or non-volatile memory. In some embodiments, the volatile memory may be considered "non-transitory" in the sense that it is not a transitory signal. Modules may be operable when executed by a processor or other computing device (e.g., a single-chip board, application specific integrated circuit, a field-programmable gate array (FPGA), a network capable computing device, a virtual machine, a cloud-based computing device, or any combination thereof). Memory spaces and storages accessible to the modules can be implemented with tangible storage memory as well, including volatile or non-volatile memory.

Each of the modules/components may operate individually and independently of other modules or components. Some or all of the modules may be executed by different computing components. The separate computing components can be coupled through one or more communication channels (e.g., wireless or wired channels) to coordinate their operations. Some or all of the modules may reside on different memory devices. Some or all of the components and/or modules may be combined as one component or module.

A single module/component may be divided into sub-modules, each sub-module performing a separate method step or method steps of the single module/component. In some embodiments, at least some of the modules share access to a memory space. For example, one module may access data accessed by or transformed by another module. The modules/components may be considered "coupled" to one another if they share a physical connection or a virtual connection, directly or indirectly, allowing data accessed or modified from one module to be accessed in another module.

Figure 5:
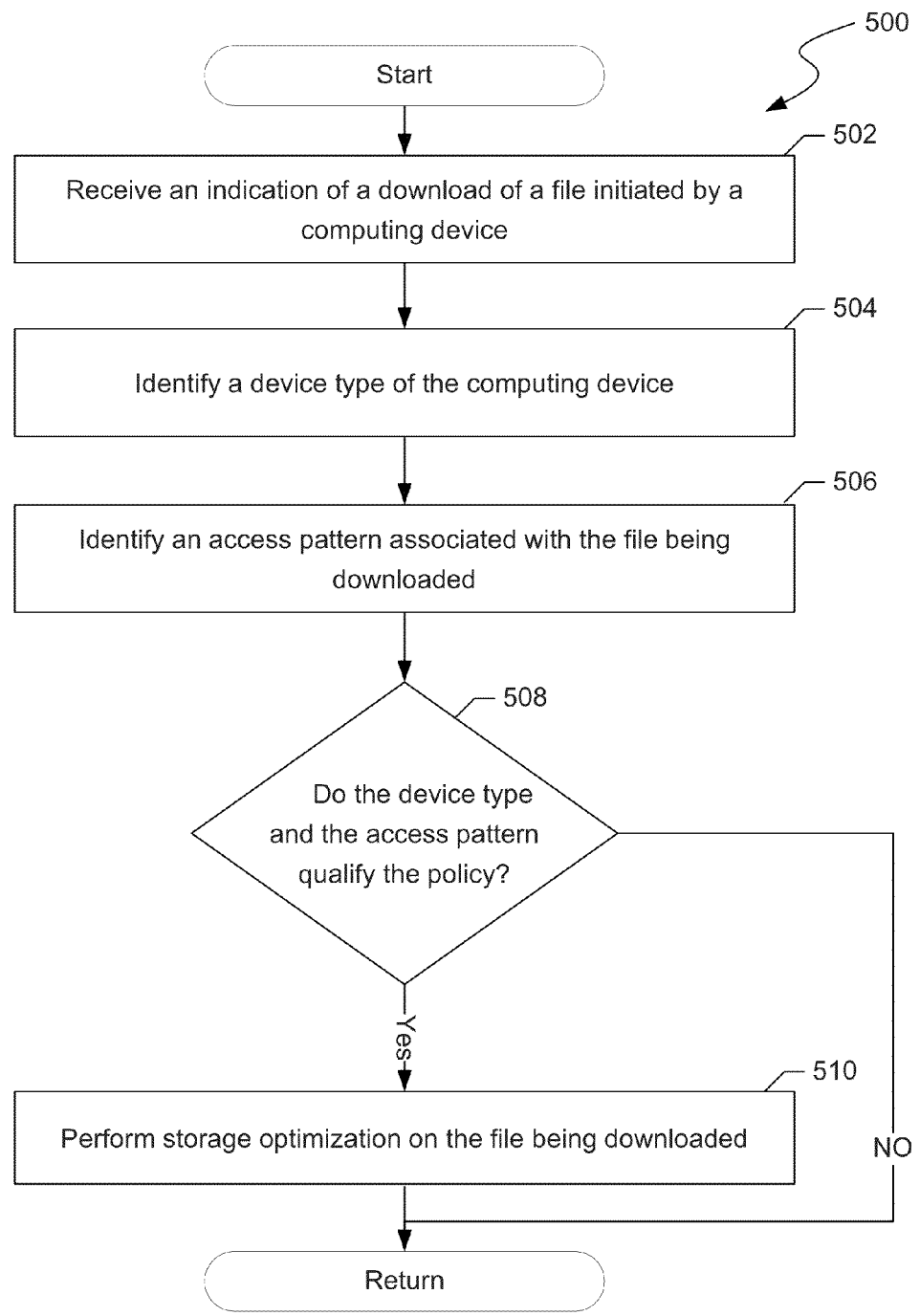
FIG. 5 illustrates a process of performing storage optimization on a file being downloaded to a computing device, in accordance with various embodiments.

FIG. 5 illustrates a process 500 of performing storage optimization of a file being downloaded to a computing device, in accordance with various embodiments. In some embodiments, the process 500 may be implemented by the App 140 in the environment 100 of FIG. 1, and using a storage optimization module 400 of FIG. 4. According to the embodiment of FIG. 5, a majority of the modules/components of the storage optimization module 400 reside on a server 110 configured to optimize storage capacity of one or more computing devices, such as computing device 104 of the user 102. Further, in the embodiment, one or more data files are stored in the server system of the content providers 130 of FIG. 1 (e.g., a web hosting system, a cloud service system, etc.).

At step 502, the network component 304 of the server 110 receives an indication that a download request of one or more files, form a content provider, has been initiated by an application executing on an operating system of a computing device of a user (e.g., device 104). The content provider can be a cloud storage server. For example, the cloud storage server provides storage of music files, and the application running on the device is a music player application. In another example, the application running on the device is a gaming computer application connecting with a web game server (i.e., content provider). According to the embodiment, the computing device of the user is a device which the user typically accesses her data files. The computing device can be mobile device, such as a smartphone, a tablet PC, a game console, a laptop, etc.

At step 504, the device classification determination module 404 determines what type of device is the computing device. The device type can be specified as a general category, such as a mobile device, or a specific category, such as a smartphone. At step 506, the access pattern determination module 402 determines an access pattern associated with the one or more files to be received from the content provider (e.g., to be downloaded into cache). For example, where the files are images of a user's web gallery, the module 402 determines the user's usage in relation to the images in that gallery. The module 402 determines that there is a low likelihood that images from a Christmas album (e.g., from three months ago) will likely be viewed, as in the last few access times, the user has viewed only images from albums created in the last three weeks.

At decision block 508, the storage optimization policy management module 406 determines, or selects, the storage optimization method to be applied based on the access pattern and the device classification, according to a set of storage optimization policies. For example, a particular storage optimization policy may consider a download request for a data set (e.g., photo albums of a web gallery) that include data which have not been accessed more than three months as a request for only relevant data. Under such policy, the images from the Christmas album in the example above should not be downloaded. In such example, the storage optimization policy management module 406 can generate an indication recommending those images not to be downloaded. The indication can be utilized, for example, by the server 110, in intercepting the user's download request to the content provider, and sending a message that only data associated with images for that last three weeks should be transmitted.

In another example, a particular storage optimization policy may consider a download request for data that is infrequently used based on access pattern from the last three months as a request for downsampling. Under such policy, for a user requesting a local storage synchronization of his music library from a cloud service, for example, the storage optimization policy management module 406 will recommend downsampling. In particular, the storage optimization policy management module 406 can generate an indication recommending downsampling songs that are infrequently listened by the user (based on access pattern). In such example, high-quality versions of the songs often accessed by the user are downloaded while the low-quality versions (i.e., downgraded format) of the songs that are infrequently listened to by the user are downloaded. Accordingly, using the various storage optimization policy, the server 110 intelligently decides downsampling of only certain data (or files) in a particular download request based on access patterns.

In another example, where the download request includes a game application, a particular storage optimization policy may decide the optimal storage optimization method based on the access pattern of a number of game levels completed by the user. For example, where the user has accessed the game to complete levels 1 through 3, the likelihood that the user will need to access data associated with those levels is low. In such example, the policy can recommend a download of a minimum necessary version (e.g., data exclusive to levels 1-3 and not required for the remaining levels of the game should not be downloaded, only a low-resolution version (i.e., downgraded format) of the image files for levels 1-3 should be downloaded, etc.).

At step 510, an operating system, working in coordination with a processor of the server 110, performs one or more storage optimization methods based on the indication received from the storage optimization policy management module 406. The storage optimization method can include downgrading the data file, i.e., converting the data file into a downgraded format. The downgraded format can include, for example, a reduced file size, a reduced image size, a thumbnail, or a lower resolution version of a copy of an image file stored on the content provider server system 130. For example, downsampling may be performed on a portion or all of the data of the download request. In the above example, low quality versions of the "infrequent" music files are downloaded to the device, as opposed to the high quality versions. In another example, a removal of a portion of data of the download request is performed (e.g., not even thumbnails of the Christmas album images are downloaded). In some embodiments, data compression may also be performed in addition to downsampling.

Figure 6:
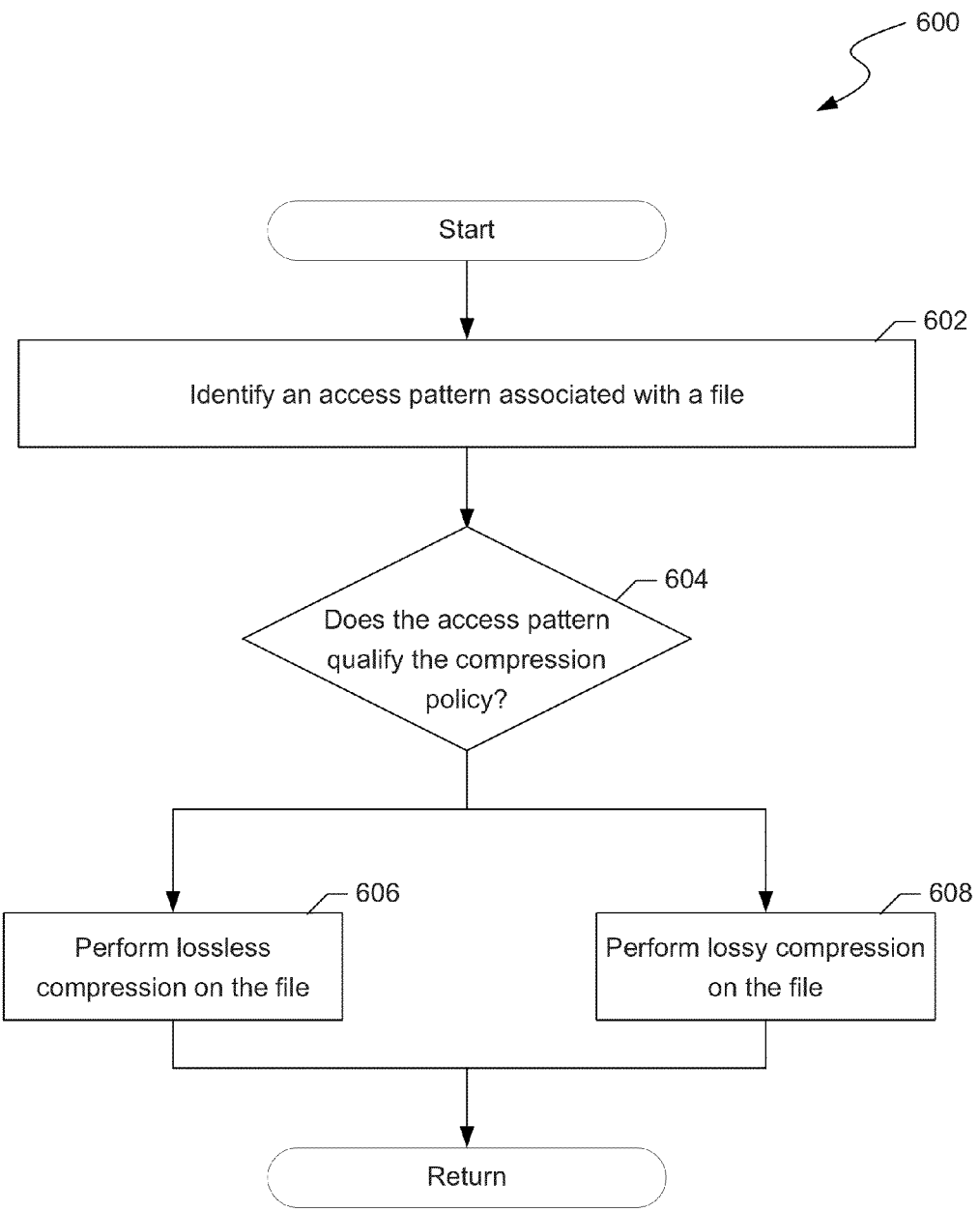
FIG. 6 illustrates a process of performing compression on a file stored on a computing device, in accordance with various embodiments.

FIG. 6 illustrates a process 600 of performing storage optimization of a file stored on a computing device (e.g., device 104 of FIG. 1), in accordance with various embodiments. In some embodiments, the process 600 may be implemented by the App 140 in the environment 100 of FIG. 1, and using a storage optimization module 400 of FIG. 4. According to the embodiment of FIG. 6, the App 140 resides on the computing device, where a majority of the modules/components of the storage optimization module 400 are residing on the computing device, such as. Further, in the embodiment, one or more data files are stored in a storage device of the computing device, such as local storage device 220 of FIG. 2. The process 600 can be a background process that runs on the computing device to compress data on a continuous basis to reduce the amount of data stored on device and improve storage capacity.

At step 602, the access pattern determination module 402 determines an access pattern associated with the one or more files stored on the computing device. For example, for an existing gaming application stored on the device, the module 402 determines which data portions, or components, of the gaming application are still relevant based on the user's access of the gaming application. The module 402 can determine that there is a low likelihood that graphic images for level 1, which has already been completed by the user, will likely be accessed by the user.

At step 604, the storage optimization policy management module 406 determines the storage optimization method to be applied based on the access pattern, according to a set of storage optimization policies. For the gaming application example, a particular storage optimization policy may consider the graphic images to be irrelevant, but that the remaining data set of the application is still relevant to the user, based on the access pattern. In such example, the storage optimization policy management module 406 can generate a compressibility indication for the graphic images.

In particular, the compressibility indication can include that lossless compression is appropriate for compressing the graphic images based on the access pattern (e.g., the user may want to revisit level 1). At step 606, the computing device performs lossless compression. This can be executed, for example, by the operating system 212 working in coordination with the processors 202. Lossless compression will allow the computing device to save storage space, yet still reconstruct the data (e.g., using decompression module 412). In another example, where reconstruction of the data is unnecessary, lossy compression may be performed, as indicated in step 608.

Figure 7:
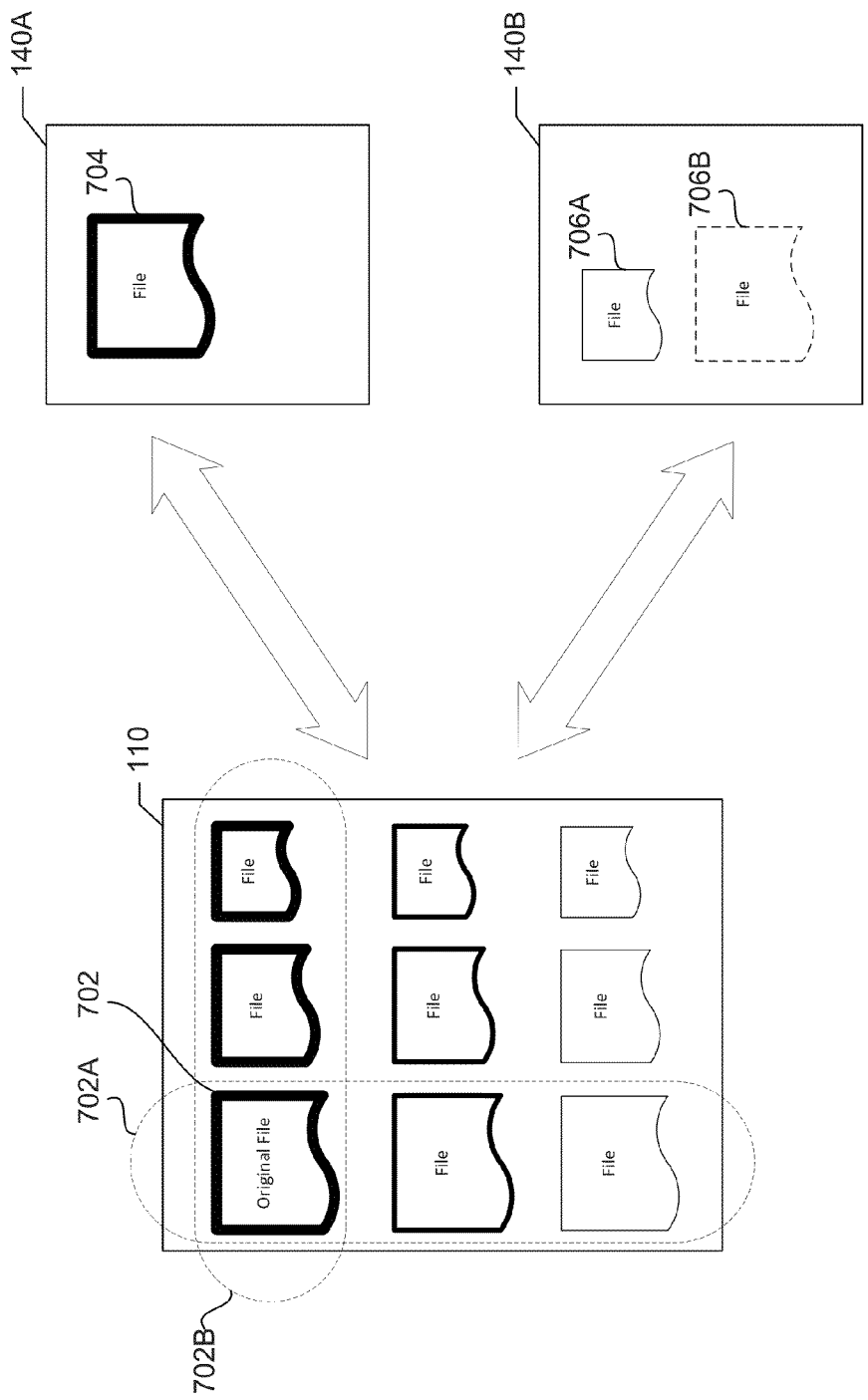
FIG. 7 is an example illustrating an image file downloaded to two computing devices based on the storage optimization policies, in accordance with various embodiments.

FIG. 7 is an example illustrating an image file 702 downloaded to two computing devices 140A, 140B based on the storage optimization policies, in accordance with an embodiment. In the illustrated embodiment, the image file 702 is stored at the server 110 in different versions, or formats, such as an original format or a downgraded format. The downgraded format includes, for example, a compressed format. The server can also store different pre-configurations for encoding the file 702, where the encoding would be applied to downsample the file 702 when the file 702 gets downloaded from the server 110 to a particular computing device at a future time. The illustrated files 702A are representative of different downsampled formats in which the file 702 would take form upon getting downloaded to a computing device. The illustrated files 702B are representative of different compressed formats in which the original formatted file has been compressed (e.g., lossless compression or lossy compression) and stored at the server 110.

In the illustrated example, the file 702 is downloaded to the computing device 140A in an original format 704, and is downloaded to the computing device 140B in a downgraded format (i.e., a compressed and downsampled format 706A). The computing device 140A may be, for example, a desktop computer used to upload and edit high quality images and the computing device 140B may be, for example, a computing tablet used to view the images. In such example, the file 702 can be a high quality image. Based on access patterns associated with the desktop computer (e.g., image editing), the original format 704 of the file 702 is downloaded to the computing device 140A, as the server 110, in coordination with the storage optimization module 310, determines that the user will likely be using the desktop computer to continue editing the file 702. On the other hand, based on the access patterns associated with the computing tablet (e.g., video viewing), the compressed and downsampled format 706A is downloaded to the computing device 140B, as the server 110, in coordination with the storage optimization module 310, determines that the user will likely not need a high resolution format. In some embodiments, the server 110 may update the format of the file 702 stored at the computing device 140B. For example, over time, the storage optimization module 310 observes that access patterns reflect that the user utilizes the computing device 140B to zoom in and make minor edits to images in general (and not necessarily to the file 702). Based on such access patterns, the server 110, in coordination with the storage optimization module 310, causes an uncompressed, but downsampled format 706B of the file 702 to be downloaded in replacement of the previous format 706A of the file 702.

The server 110 can generate and store one or more downgraded formats (or encoding pre-configurations associated with the downgraded format) for the data file 702. In some embodiments, the user of the computing device provides the file 702 in its original format, and the server 110, working in coordination with the storage optimization module 310, determines the appropriate optimization operation to be performed on the file 702 based on access patterns and device identification. In such embodiments, if compression is determined as appropriate, compression is performed on the data file 702 and stored at the server 110. Compression can be performed multiple times in accordance with the storage compression policies (based on access pattern and device identification), such that several compressed formats of the file 702 are generated and stored at the server for access at a later time. Upon downloading of the file 702 to a particular computing device, the server 110, in coordination with the storage optimization module 310, can select the appropriate compressed format to transmit to that device. If downsampling is determined to be appropriate, an appropriate encoding is specified and stored (as a pre-configuration) in association with the file 702. More than one appropriate encoding may be generated in accordance with the storage compression policies (based on access pattern and device identification). Upon a downloading to a particular computing device, the appropriate encoding is selected and the file is downsampled using that pre-configured downsampling coding.

Various other known techniques can be used to generate a downgraded format of the data file 702. In some embodiments, the server 110 can identify the source of a data file, and obtain a downgraded format of the data file from the source. For example, if an MP3 music file uploaded to the server 110 is a file that the user of the computing device 140 has downloaded from a particular source (e.g., content provider 130), the server 110 can obtain a downgraded format of the MP3 file, e.g., a lower bit rate or a shorter duration file, from the particular source and store at the storage device 308. In some embodiments, the user of the computing device 140 can provide a copy of the downgraded format for the data file 702 to the server 110 (i.e., the computing device 140 is the source itself), for example, initially when the data file 702 is backed up to the server 110.

Figure 8:
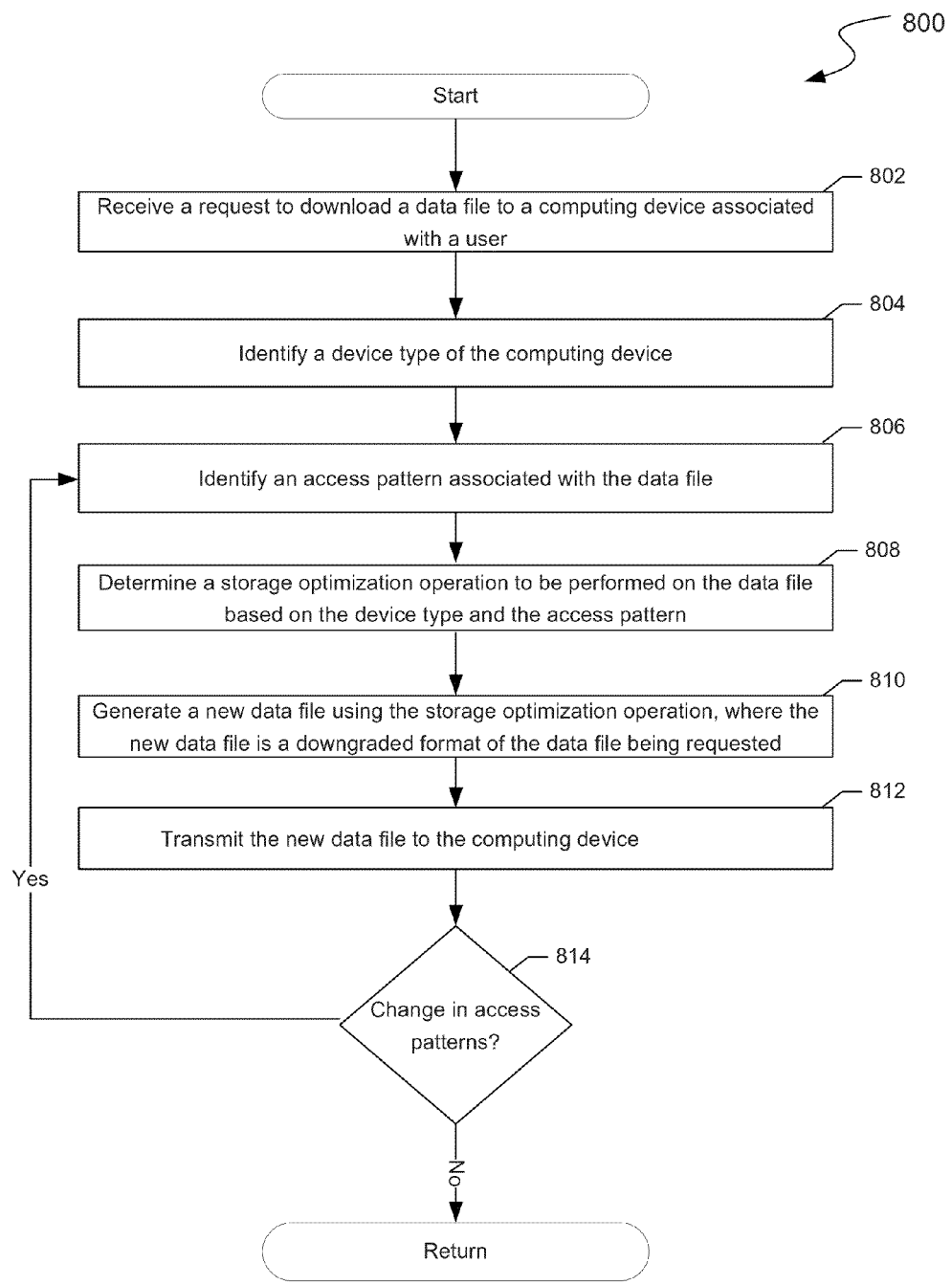
FIG. 8 illustrates a process of performing storage optimization on a file based on a change in access patterns, in accordance with various embodiments.

FIG. 8 illustrates a process 800 of performing storage optimization on a file based on a change in access patterns, in accordance with various embodiments. The process 800 can be performed by a server (e.g., server 110 of FIG. 1) that stores one or more data files for sharing with one or more computing devices (e.g., 140A-N) associated with a user, where the computing devices are connected to the server over a network, according to an embodiment.

At step 802, the server receives a request to download a given data file (i.e., a particular data file from the one or more data files stored at the server) to a given computing device (i.e., a particular computing device from the one or more computing devices associated with the user). The given data file is stored at the server to be shared, or accessed, by the user using any of the user's one or more computing devices connected to the server via the network. In some embodiments, the process 800 does not include step 802. In such embodiments, the given data file is automatically synchronized, or downloaded, to the given computing device by the server performing a synchronization process in the background. In particular, the server communicates with a data synchronization module at each of the computing devices to determine which data file(s) to be synchronized at each device.

At step 804, the server identifies a device type of the given computing device sending the request to download. As discussed above, the device type, or device classification, can include any combination of a smartphone, a computing tablet, a laptop, a desktop, etc. At step 806, the server identifies a user access pattern associated with the given data file. In particular, to determine the user access pattern, the server aggregates, from the one or more computing devices associated with the user, access patterns associated with the given data file and one or more other data files related to the given data file. The other data files are related to the given data file based on a share of certain common attributes. The common attributes can include, for example, a data type or a data origination source (e.g., website, cloud storage system, creation device, etc.). For example, where the given data file is a video game file, the other data files can include (a) files of other video games or (b) files of the same video game to which the given data file belongs. In another example, where the given data file is a music file created using an application on a computing device X, the other data files can include other music files (i.e., same data type) that have been created using the application on the computing device X (i.e., same origination source). Each access pattern aggregated by the server is based on an access of the corresponding data file by the user on the one or more computing devices.

At step 808, the server determines a storage optimization operation to be performed on the given data file. The storage optimization operation is determined as a function of the device type and the user access pattern identified at step 806. The storage optimization operation, once executed, converts the given data file into a downgraded format that corresponds to the device type and the user access pattern. At step 810, the server performs the first storage optimization operation on the given data file to generate a new data file, where that new data file is a downgraded format, or version, of the given data file (i.e., original format). At step 812, the server transmits the new data file to the computing device.

At step 812, the server monitor the access patterns for any change. That is, the server continues to receive access patterns from the computing devices of the user and continues to aggregate the access patterns. In this process, the server detects for any change in accessing the given data file. For example, the access patterns indicate that the user is increasingly not using certain image files (e.g., the given data file and/or other related data files) on the computing device and/or the other computing devices. In such example, the server, in response to detecting such change, repeats steps 806-812 to update the version, or format, of the given data file that is downloaded (or synchronized) to the given computing device. That is, the server automatically transmits to the given computing device an updated (or new) data file based on the server's monitoring of the access patterns. In some embodiments, the server may choose to send a new data file that is an upgraded format of the given data file based on the monitoring, as opposed to a downgraded format. For example, the server notices that the user is increasingly editing certain image files, e.g., either the given data file or other related data files. As such, the server can send, for example, an original format of the image file (i.e., the given data file) to the computing device to replace the previous version of that file (i.e., downgraded version). In another example, the server sends another downgraded version of the original format, where this second downgraded version is less downgraded than the previous downgraded version. For example, the previous version is a downsampled and compressed version while the second downgraded version is only downsampled, with no compression.

Figure 9:
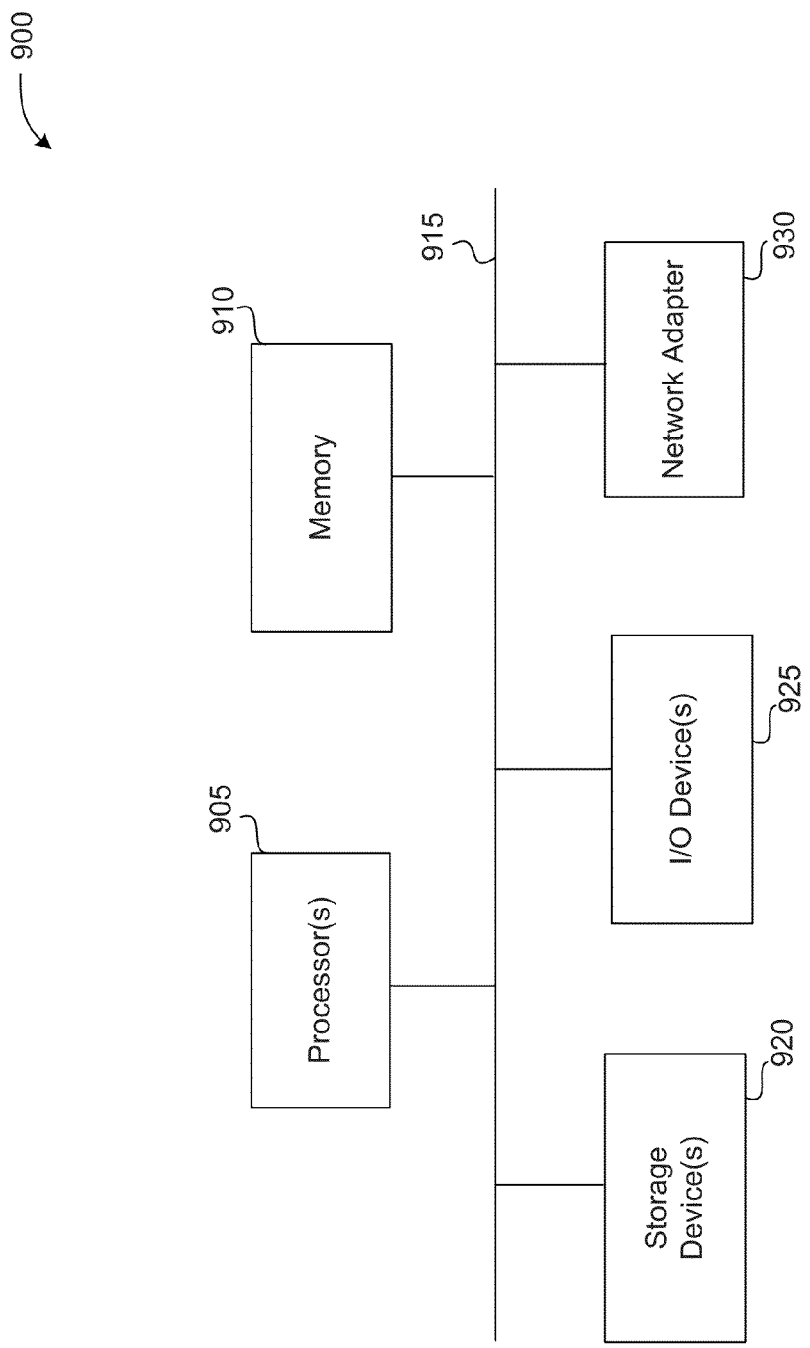
FIG. 9 is a block diagram illustrating components of a computer system that can perform various operations described by the disclosed technology.

FIG. 9 is a block diagram of a computer system as may be used to implement features of some embodiments of the disclosed technology. The computing system 900 may include one or more central processing units ("processors") 905, memory 910, input/output devices 925 (e.g., keyboard and pointing devices, display devices), storage devices 920 (e.g., disk drives), and network adapters Error! Reference source not found. 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

What is claimed is:

1. A computer-implemented method for managing storage of a given computing device associated with a user, the method comprising:
    receiving, at a computer server system coupled to the given computing device, a request to download a given data file to the given computing device associated with the user, the given data file being stored at the server for sharing among a plurality of computing devices associated with the user;
    identifying, by the computer server system, a device type of the given computing device based on the request;
    identifying, by the computer server system, a first user access pattern associated with the given data file, the first user access pattern identified based on an aggregation, from the plurality of computing devices, of access patterns associated with a set of data files, each access pattern being based on an access of the corresponding data file by the user on the plurality of computing devices associated with the user, the set of data files including the given data file and other related data files associated with the given data file, the other related data files and the given data file sharing common attributes, the common attributes including any of a data type or a data origination source;
    determining, by the computer server system, a first storage optimization operation to be performed on the given data file, the first storage optimization operation determined as a function of the device type and the first user access pattern, the first storage optimization operation converting the given data file into a first downgraded format that corresponds to the device type and the first user access pattern;
    generating, by the computer server system, a first data file by performing the first storage optimization operation on the given data file, the first data file being the first downgraded format of the given data file;
    transmitting, by the computer server system, the first data file to the computing device;
    monitoring, by the computer server system, for a change in the access patterns associated with the set of data files;
    identifying, by the computer server system, a second user access pattern associated with the given data file based on said change in the access patterns;
    determining, by the computer server system, a second storage optimization operation to be performed on the given data file, the second storage optimization operation determined as a function of the device type and the second user access pattern, the second storage optimization operation converting the given data file into a second downgraded format that corresponds to the device type and the second user access pattern;
    generating, by the computer server system, a second data file by performing the second storage optimization operation on the given data file, the second data file being the second downgraded format of the given data file;
    transmitting, by the computer server system, the second data file to the computing device, wherein said transmitting is done automatically by the computer server system based on said monitoring.

2. The computer-implemented method of claim 1, wherein the device type comprises any of a smartphone, a computing tablet, a laptop, or a desktop.

3. The computer-implemented method of claim 1, wherein the data origination source includes any of a particular computing device of the plurality of devices associated with the user or a content provider including a website or a cloud storage service server.

4. The computer-implemented method of claim 1, wherein each of the first and second storage optimization operations includes any one of a compression operation or a downsampling operation.

5. The computer-implemented method of claim 4, wherein the compression operation comprises any of a lossy data compression operation or a lossless data compression operation.

6. The computer-implemented method of claim 1, wherein the given data file is an image file, and wherein the downgraded format is at least one of a reduced image size, a thumbnail, or a lower resolution version of the given data file.

7. The computer-implemented method of claim 1, wherein the given data file is an audio file, and wherein the downgraded format is at least one of a reduced audio size or a lower quality version of the given data file.

8. A server system comprising:
a processor;
a network component that works in coordination with the processor to receive a request for downloading a given data file to a computing device associated with a user;
a device classification module that works in coordination with the processor to identify a device type of the computing device;
an access pattern determination module that works in coordination with the processor to:
identify a first access pattern associated with the given data file, the first access pattern identified based on an aggregation, from a plurality of computing devices, of access patterns associated with a set of data files, each access pattern being based on an access of the corresponding data file by the user on the plurality of computing devices associated with the user, the set of data files including the given data file and other related data files associated with the given data file, the other related data files and the given data file sharing common attributes, the common attributes including any of a data type or a data origination source;
monitor for a change in the access patterns associated with the set of data files; and
identify a second access pattern associated with the given data file, the second access pattern identified based on said change in the access patterns;
a storage optimization policy management module that works in coordination with the processor to:
determine a first storage optimization operation to be performed on the given data file, the first storage optimization operation determined as a function of the device type and the first access pattern; and
determine a second storage optimization operation to be performed on the given data file, the second storage optimization operation determined as a function of the device type and the second access pattern;
a downsampling module that works in coordination with the storage optimization policy management module to generate any of a first data file and a second data file by performing the corresponding storage optimization operation determined by the storage optimization policy management module, the first data file being a first downgraded format of the given data file, the second data file being a second downgraded format of the given data file; and
a data compression module that works in coordination with the storage optimization policy management module to generate any of the first data file or the second data file by performing the corresponding storage optimization operation determined by the storage optimization policy management module.

9. The server system of claim 8, wherein the network component further works in coordination with the processor to transmit the first data file and the second data file to the computing device.

10. The server system of claim 8, wherein the device type comprises any of a smartphone, a computing tablet, a laptop, or a desktop.

11. The server system of claim 8, wherein the data origination source includes any of a particular computing device of the plurality of devices associated with the user or a content provider including a website or a cloud storage service server.

12. The server system of claim 8, wherein for the downsampling module, each of the first and second storage optimization operations includes a downsampling operation.

13. The server system of claim 8, wherein for the data compression module, each of the first and second storage optimization operations includes a compression operation.

14. The server system of claim 13, wherein the compression operation comprises any of a lossy data compression operation or a lossless data compression operation.

15. The server system of claim 8, wherein the given data file comprises any of an audio file, a video file, or an image file.

16. The server system of claim 8, wherein each of the access patterns comprises parameters, the parameters including any of: a frequency of access of a particular data file, a number of times the particular data file is requested, a time period for which the particular data file is accessed, a last access time of the particular data file, or a location of the particular data file being accessed or requested for download.

17. The server system of claim 8, wherein the server system is any of a cloud storage server system or a website hosting server system.

18. A non-transitory computer readable storage medium storing computer executable instructions, comprising:
instructions for receiving, at a computer server system coupled to the given computing device, a request to download a given data file to the given computing device associated with the user, the given data file being stored at the server for sharing among a plurality of computing devices associated with the user;
instructions for identifying, by the computer server system, a device type of the given computing device based on the request;
instructions for identifying, by the computer server system, a first user access pattern associated with the given data file, the first user access pattern identified based on an aggregation, from the plurality of computing devices, of access patterns associated with a set of data files, each access pattern being based on an access of the corresponding data file by the user on the plurality of computing devices associated with the user, the set of data files including the given data file and other related data files associated with the given data file, the other related data files and the given data file sharing common attributes, the common attributes including any of a data type or a data origination source;
instructions for determining, by the computer server system, a first storage optimization operation to be performed on the given data file, the first storage optimization operation determined as a function of the device type and the first user access pattern, the first storage optimization operation converting the given data file into a first downgraded format that corresponds to the device type and the first user access pattern;

instructions for generating, by the computer server system, a first data file by performing the first storage optimization operation on the given data file, the first data file being the first downgraded format of the given data file;

instructions for transmitting, by the computer server system, the first data file to the computing device;

instructions for monitoring, by the computer server system, for a change in the access patterns associated with the set of data files;

instructions for identifying, by the computer server system, a second user access pattern associated with the given data file based on said change in the access patterns;

instructions for determining, by the computer server system, a second storage optimization operation to be performed on the given data file, the second storage optimization operation determined as a function of the device type and the second user access pattern, the second storage optimization operation converting the given data file into a second downgraded format that corresponds to the device type and the second user access pattern;

instructions for generating, by the computer server system, a second data file by performing the second storage optimization operation on the given data file, the second data file being the second downgraded format of the given data file;

instructions for transmitting, by the computer server system, the second data file to the computing device, wherein said transmitting is done automatically by the computer server system based on said monitoring.

19. The non-transitory computer readable storage medium of claim 18, wherein the each of the access patterns comprises parameters, the parameters including any of: a frequency of access of a particular data file, a number of times the particular data file is requested, a time period for which the particular data file is accessed, a last access time of the particular data file, or a location of the particular data file being accessed or requested for download.

20. The non-transitory computer readable storage medium of claim 18, wherein each of the first and second storage optimization operations includes any one of a compression operation or a downsampling operation.

* * * * *